United States Patent [19]

Bold et al.

[11] Patent Number: 5,381,970
[45] Date of Patent: Jan. 17, 1995

[54] COMBINATION CHIPPER/SHREDDER AND VACUUM APPARATUS FOR LAWNS AND GARDENS

[75] Inventors: Alfred J. Bold, Waterford; Steven E. Kodesch, Schenectady; William F. Sheehan, Troy, all of N.Y.

[73] Assignee: Garden Way Incorporated, Troy, N.Y.

[21] Appl. No.: 101,778

[22] Filed: Aug. 3, 1993

Related U.S. Application Data

[63] Continuation of Ser. No. 757,662, Sep. 10, 1991, abandoned.

[51] Int. Cl.⁶ .............................................. B02C 18/08
[52] U.S. Cl. ....................................... 241/55; 241/74; 241/92; 241/101.7
[58] Field of Search ................ 241/92, 55, 74, 101.7

[56] References Cited

U.S. PATENT DOCUMENTS

| | | | |
|---|---|---|---|
| 2,658,318 | 11/1953 | Miller | 241/55 X |
| 2,706,372 | 4/1955 | Blydenburgh | 241/74 X |
| 3,153,435 | 10/1964 | Ober | 241/101.7 X |
| 3,496,977 | 2/1970 | Gifford | 241/101.7 X |
| 3,688,479 | 9/1972 | Martinson et al. | 241/101.7 X |
| 3,712,353 | 1/1973 | Ferry | 241/101.7 X |
| 3,716,089 | 2/1973 | Bateman | 241/101.7 X |
| 3,929,236 | 12/1975 | Koturov | 241/101.7 X |
| 3,968,938 | 7/1976 | Ruhl et al. | 241/101.7 X |
| 4,057,952 | 11/1977 | Brokaw | 241/101.7 X |
| 4,117,983 | 10/1978 | Browning | 241/55 |
| 4,580,735 | 4/1986 | Lange | 241/101.7 |
| 4,595,148 | 6/1986 | Luerken et al. | 241/92 |
| 4,951,882 | 8/1990 | Ober | 241/55 |
| 5,018,672 | 5/1991 | Peck et al. | 241/92 X |
| 5,102,056 | 4/1992 | Ober | 241/55 |
| 5,137,219 | 8/1992 | Morey | 241/101.7 X |

FOREIGN PATENT DOCUMENTS 2727164 12/1977 Germany.

*Primary Examiner*—Richard K. Seidel
*Assistant Examiner*—Raymond D. Woods
*Attorney, Agent, or Firm*—Hayes & Reinsmith

[57] ABSTRACT

Multi-purpose apparatus having a single power-driven disc-like element to effect chipping of branches and related debris fed into a disc-mounted blade/aperture configuration on one side of the disc with a vacuum/volume reduction structure having fan blades disposed on the other side of the disc cooperating with a cylindrical screen. The disc and screen are located within a housing having an air inlet for air moved by the fan blades whereby debris can be drawn in from the front end of an air passageway connected to the air inlet and discharged with the chips and debris through the screen out of a single outlet. The outlet is located at the top of a generally volute housing and the apparatus can be mounted on wheels for walk-behind operation with handlebars supporting a debris collection bag attached to the outlet end of the housing. A passageway conducts air into the housing to which attachments can be affixed.

3 Claims, 5 Drawing Sheets

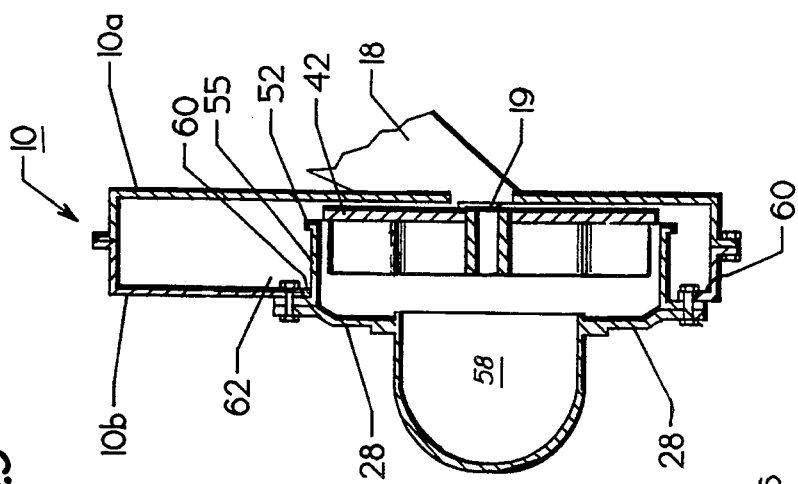
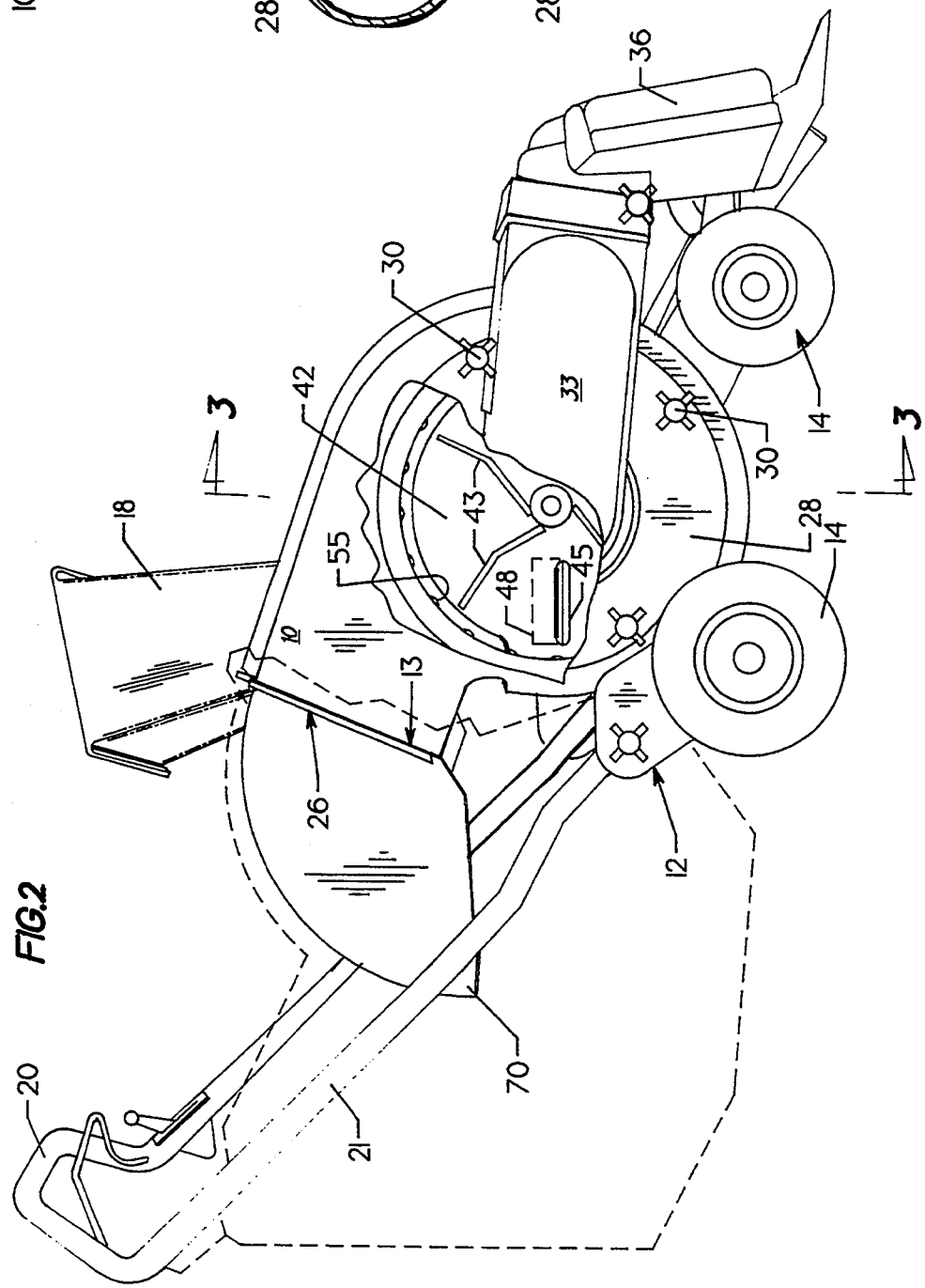

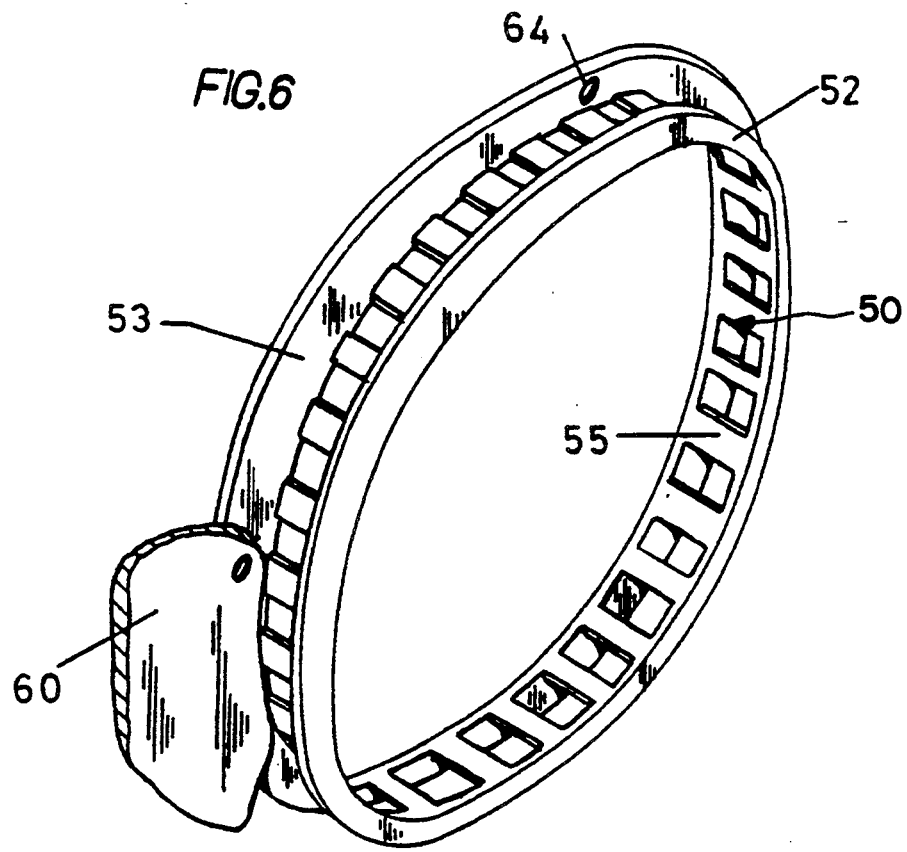
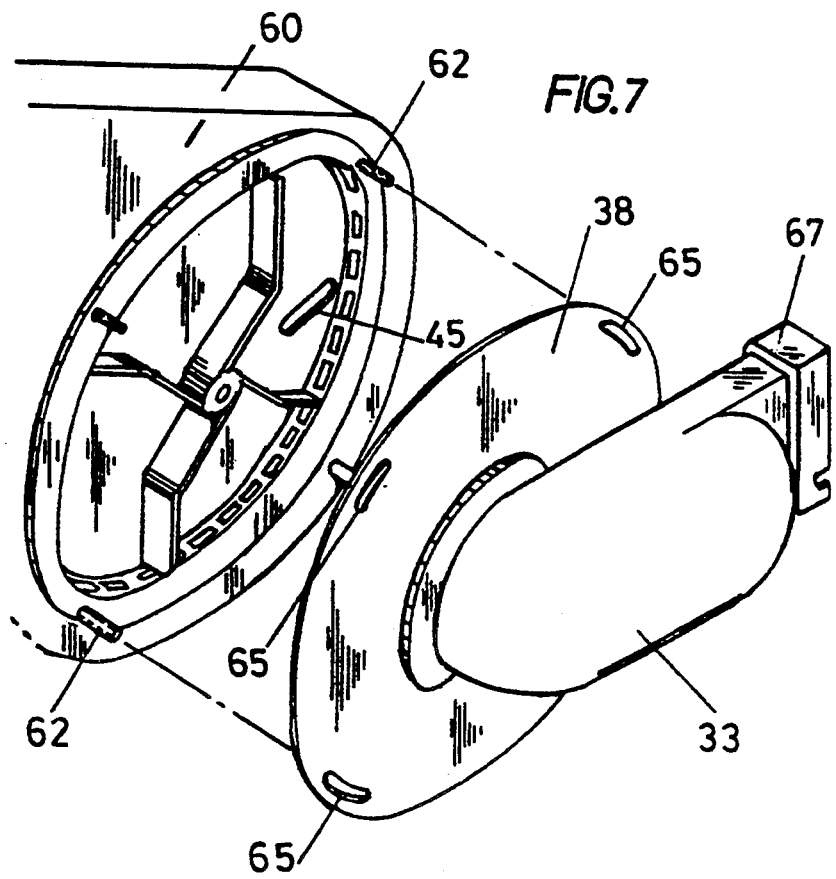

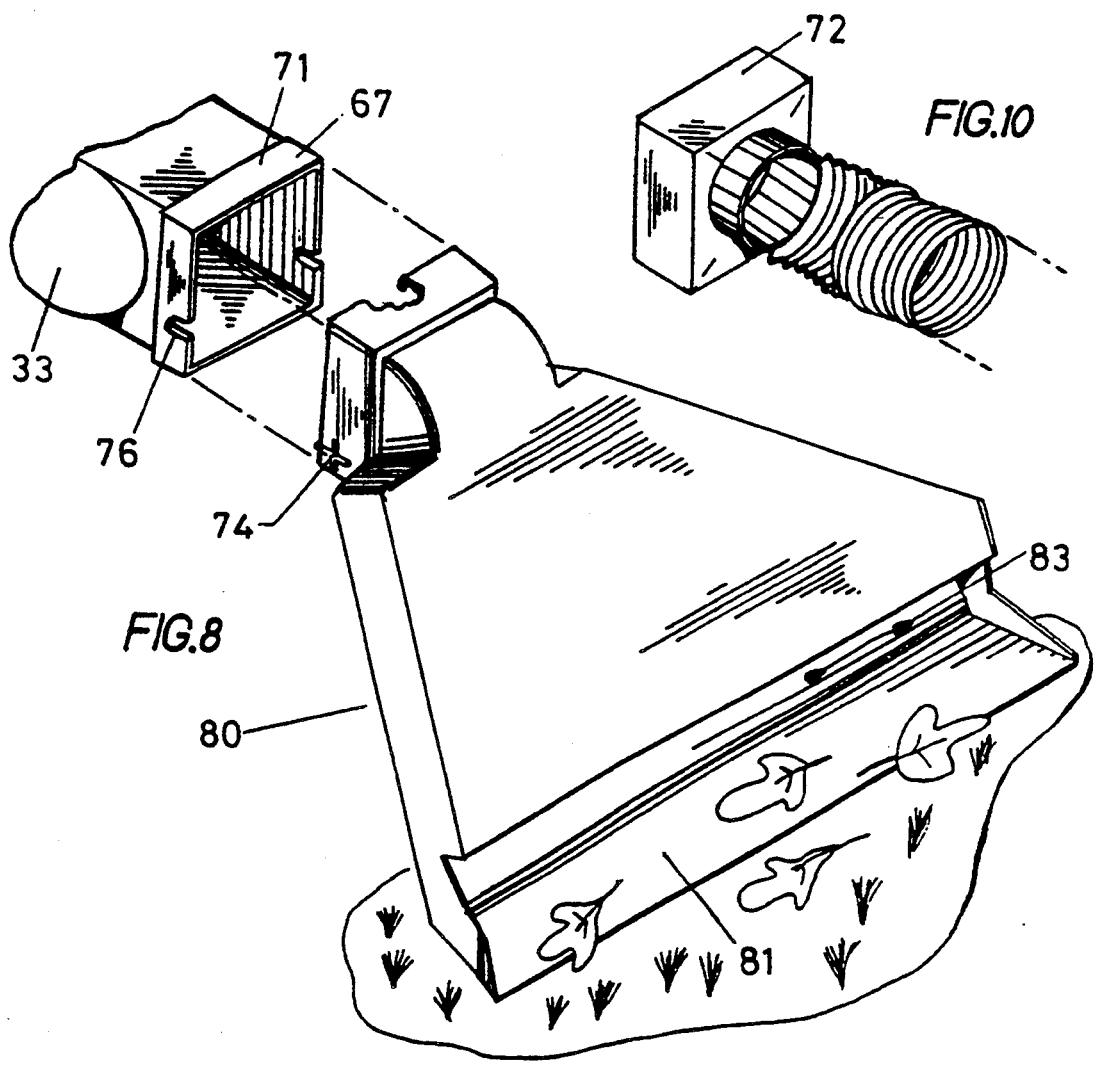
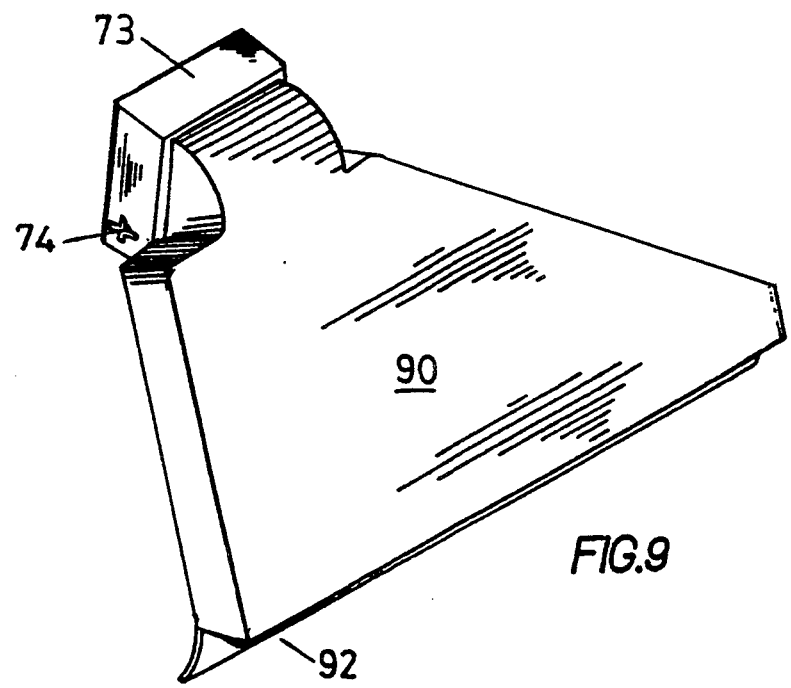
FIG.8
FIG.10
FIG.9

COMBINATION CHIPPER/SHREDDER AND VACUUM APPARATUS FOR LAWNS AND GARDENS

This is a continuation of copending application Ser. No. 07/757,662, filed on Sep. 10, 1991, abandoned.

FIELD OF THE INVENTION

This invention relates to multi-purpose leaf, lawn and garden debris collection and disposal apparatus.

BACKGROUND OF THE INVENTION

The disposal of lawn and garden debris for a homeowner has become a problem primarily because many areas of the country are closing landfills and prohibiting the burning of refuse and debris, thereby complicating the disposal issue for the homeowner. Some communities have undertaken to collect leaves, grass clippings, branches, etc. in an effort to provide central disposal facilities but the cost of such central facilities and the cost of collection from the homeowner's property is becoming prohibitive. It is even expected that such debris as lawn clippings and leaves will not be collected because the centralized community facilities no longer can accept such debris. Over the years many devices have been created to deal with such debris problems leading to the development of vacuuming devices and pulverizing devices such as chippers and shredders. Combination devices which attempt to place on a single frame the apparatus necessary for turning limbs and branches into wood chips to be collected along with leaves, grass clippings, etc., have also been developed using a variety of structures.

OBJECTS OF THE INVENTION

It is a principal object of the invention to provide low cost, durable and easy to use apparatus for performing a wide variety of debris vacuuming chores while, at the same time, providing apparatus to perform limb and branch clipping as well as shredding functions.

It is also a principal object of this invention to provide apparatus for use by a homeowner which reduces the volume of leaves, grass, limbs, twigs and other debris to expedite composting use in recycling or other disposal.

It is a still further object of the invention to provide combination chipping, shredding and vacuuming apparatus mounted on a single frame with a compact housing with fewer moving parts while being easy to move and store and which accommodates a single bag for all of the output debris.

An additional object is the construction of multi-purpose apparatus for lawn and garden chores such as chipping, shredding and vacuuming which apparatus has a minimum number of replaceable parts to wear out and minimum structural complexity so as to permit facile use by a homeowner.

Other objects will be in part obvious and in part pointed out in more detail hereinafter.

A better understanding of the objects, advantages, features, properties and relations of the invention will be obtained from the following detailed description and accompanying drawings which set forth certain illustrative embodiments and are indicative of the various ways in which the principles of the invention are employed.

SUMMARY OF THE INVENTION

The preferred embodiment of the multi-purpose apparatus of this invention has a single power-driven disc-like element to effect chipping of branches and related debris fed into a disc-mounted blade/aperture configuration on one side of the disc and a vacuum/volume reduction structure for the apparatus featuring fan blades disposed on the side of said disc opposite to the chipping blade, the fan being encompassed by a generally cylindrical screen located within a housing provided with an air inlet coaxial with the axis of rotation and adjacent to the fan blades whereby debris can be drawn in from the front end of an air passageway connected to the central aperture and discharged with the chips and debris through the screen out of a single outlet, the outlet being located at the top of a generally volute housing that encloses the disc. The apparatus can be mounted on wheels for walk-behind operation with handlebars supporting a debris collection bag whose inlet is attached to the outlet end of the housing, the housing being arranged in a generally volute configuration to place the outlet at the top of the housing opposite to the front air inlet to which attachments can be affixed.

BRIEF DESCRIPTION OF THE DRAWINGS

FIG. 2 is a side view of the apparatus of FIG. 1 with the bag removed for clarity of presentation and a portion of the outer housing broken away to show interior features;

FIG. 3 is a cross section of the apparatus of FIG. 2 taken along the lines 3—3 of FIG. 2 but without the housing broken away;

FIG. 6 is a perspective view of the generally cylindrical screen of the invention;

FIG. 7 is a partially exploded view illustrating the disc and screen installed in the housing aperture;

FIG. 8 is a schematic illustration of one attachment that can be used with the invention;

FIG. 9 is a schematic of yet another attachment that can be used with the invention; and FIG. 10 is a schematic illustration of a still further attachment that can be used with the invention.

Figure 1:
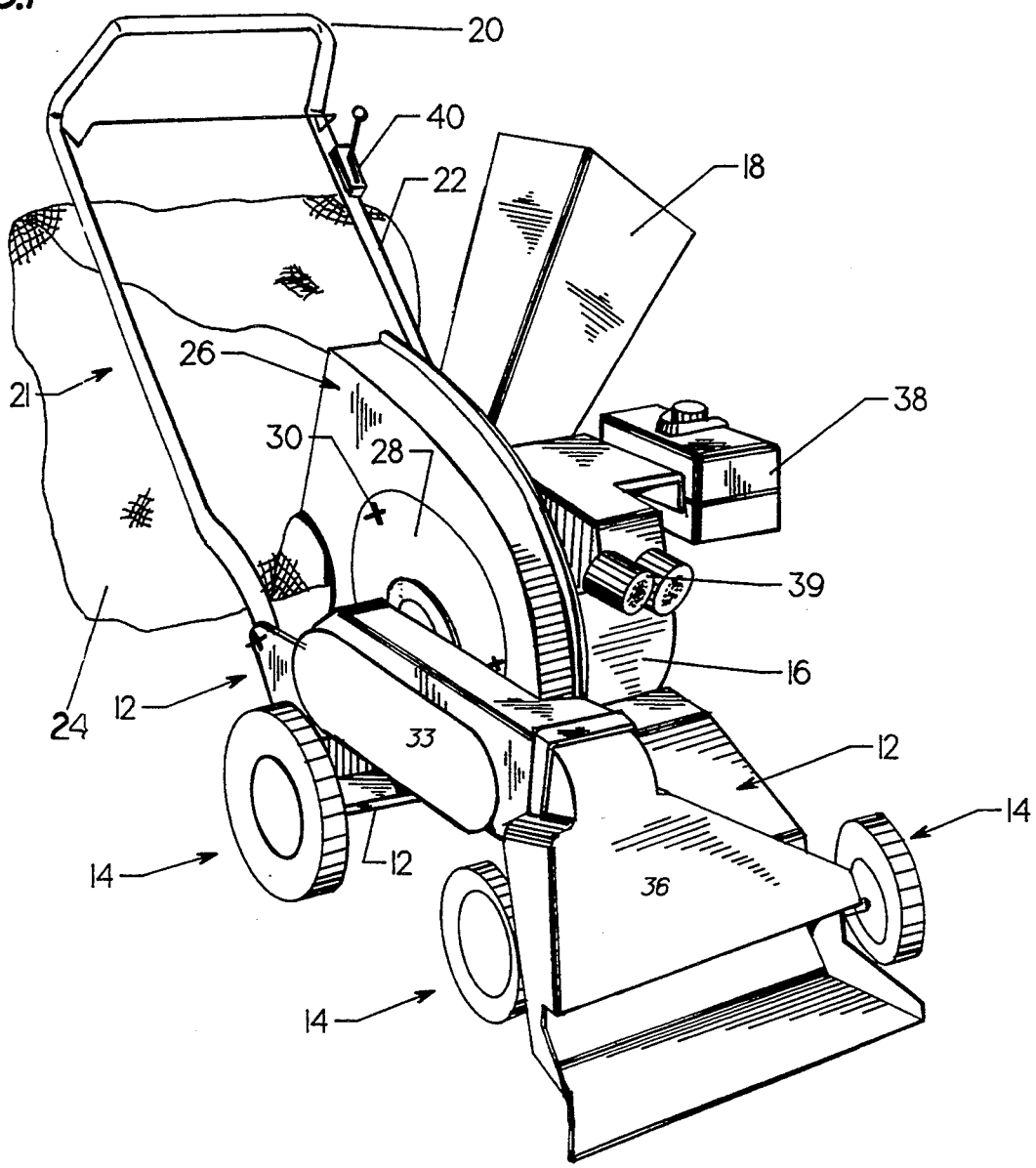
FIG. 1 is a perspective view of typical apparatus made in accordance with the present invention and showing certain principal features of the apparatus.

Turning now to the drawings and particularly FIG. 1 which shows a perspective view of a preferred embodiment of the apparatus of this invention, a housing generally designated 10, includes a frame 12 which supports and is supported by wheels 14, the frame and housing cooperating to support a drive engine 16. A generally rectangular chipper inlet chute 18 forms a part of the housing 10 and the housing 10 and frame 12 support a suitable handlebar structure 20, the parallel bars 21 and 22 of the handlebar supporting a receptacle such as a bag 24 attached so the housing at 26. Housing 10 is provided with removable cover 28 secured by the fasteners 30 to the housing, cover 28 forming one end of air passageway 33 which extends from cover 28 forwardly and away from the bag 24 to engage a suitable accessory 36 which will be described in greater detail hereinafter.

For completeness, it is noted that the engine 16 is a typical gasoline engine having a gas tank 38, air inlet and exhaust elements 39 and a throttle control lever 40 for controlling speed of that engine.

Turning next to further details of construction of the apparatus of this invention, it is seen at FIG. 2 that the partially cut-away portion of housing 10 reveals a plate-like disc 42 having fan blade elements 43 affixed thereto on one face thereof. The disc 42 has an aperture 45 extending axially therethrough adjacent a chipper blade located on the other side of disc 42 as shown in dotted lines 48. Screen 50, best seen in FIGS. 6 and 7 is comprised of pair of circular rims 52 and 53 joined in spaced intervals along the full 360 degrees by a plurality of cross bars 55. Rim 53 is of a larger diameter than rim 52 so as to provide a rim portion which overlies housing 10 and in particular the housing material adjacent to the air entrance aperture 58 formed by the sidewalls 60 surrounding the aperture 58 in housing 10. A plurality of fasteners 62 are secured to the sidewall 60 so as to mate with appropriate apertures 64 in rim 53 of screen 50 and to engage cover 28 as best seen in FIGS. 1 and 7. It should be noted that screen 50 overlies the ends of blades 43. Cover 28 and air passage 33 can be formed as a single unitary molding of a suitable plastic material with cover 28 being provided with slots 65 which mate with the aforementioned fastener 62 so that appropriate, easily removable fasteners can be provided to secure, in a simultaneous matter, the screen 50 and the cover 28 in position on housing 10. The slots 65 are provided to permit rotational adjustment of cover 28 to accommodate a variety of attachments that may be affixed to inlet end 67 as hereinafter described.

Referring particularly to FIGS. 1, 2 and 3, it is seen that the housing portion 10 is generally comprised or two generally cup-shaped sheet metal members, 10a and 10b fastened along their mating lines to define a closed chamber into which air is drawn by the fan blades 43 through inlet 33 and inlet end 67 (with attachments affixed thereto). Housing portion 10a supports chipper inlet 18 in a position where its open end 19 is aligned with chipper blade 48 (see FIGS. 4 and 5) with the bottom edge of chipper inlet 18 forming an anvil against which the chipping action takes place. The wood chips pass through aperture 45 in the disc and into the chamber defined by cover 28 and housing 10 together with the screen 55 which extends for the full 360 degrees of disc rotation. The outlet 13 defined at the top of housing 10 is shown in FIG. 2 as having a deflector 70 secured thereto which deflector serves to direct the chips and debris downwardly away from the operator standing behind handlebar 20 toward the ground; deflector 70 is substantially the same size as the upper outlet opening 13 of housing 10 and is secured thereto by any suitable means. With bag 24 in place, which bag is usually a fairly loosely woven but durable mesh, wood chips, debris, grass clippings and leaves, chipped and broken up by passage through screen 50 are deposited in the bag.

The nozzles suitable for attachment to end 67 of air passageway 33 are best seen detail in FIGS. 8, 9 and 10, each nozzle attachment being secured in the illustrated embodiment by the engagement of upper lip 73 behind shoulder 71 thereby to pivot the attachment in downward direction so that captive fasteners 74 can engage the slots 76. Nozzle 80 has a generally trapezoidal configuration with front, back and side walls and a ramp 81 which defines a nozzle such that the air moving as indicated by the arrows 83 will carry leaves and entrained debris into the air inlet passageway 33. FIG. 9 has the same type of fitting as shown in FIG. 8 including an upper lip 73 and captive fastener 74 which cooperate with the appropriate slots while its shape 90 is substantially the same as that shown in FIG. 8, a flexible lip 92 is provided rather than ramp 81 so as to constrain the air inlet flow and increase the accumulation of leaves, grass and the like. The attachment of FIG. 8 can be used in conjunction with a rake if an individual wants to rake materials onto the ramp and both the attachments of FIG. 8 and FIG. 9 can be adjusted relative to the ground over which the apparatus moves on the wheels 14 by adjusting the position of the fastener 62 in the slot 65 of the cover member of the air passageway. Finally, there is shown in FIG. 10 a hose attachment having a fitting 72 to be attached to inlet 67, which hose attachment can be used to clean hard-to-reach places such as gardens and the like.

Figure 4:
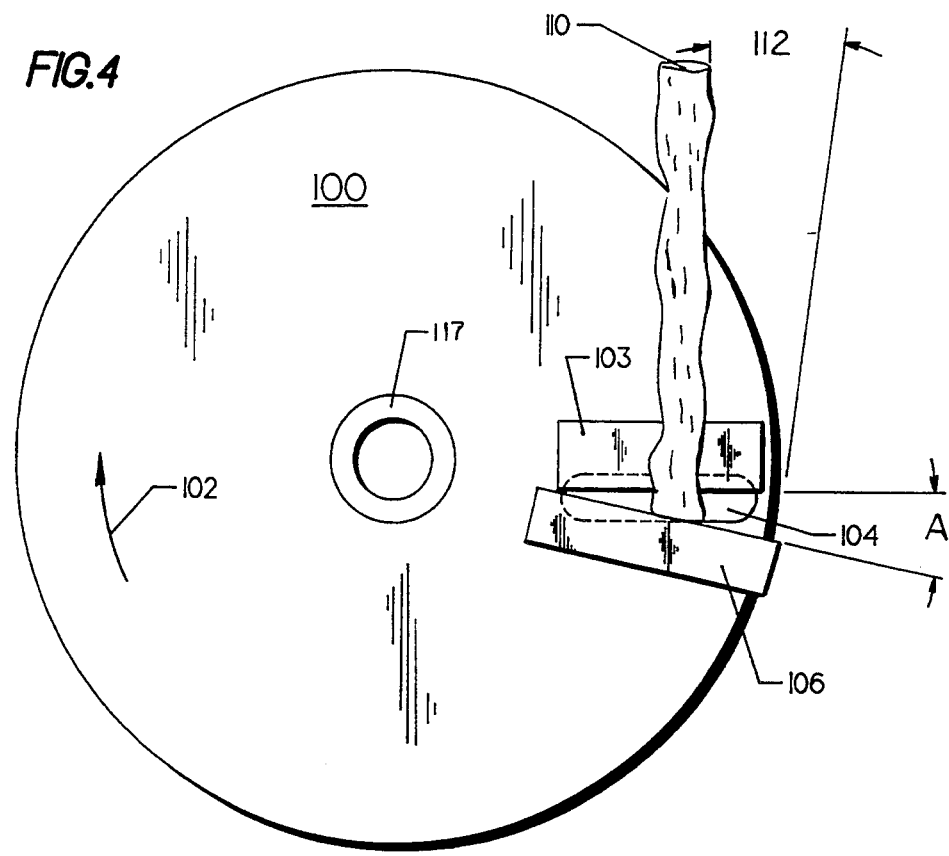
FIG. 4 is a schematic side elevation view of a portion of the disc showing details of the chipping action of the present invention.
Figure 5:
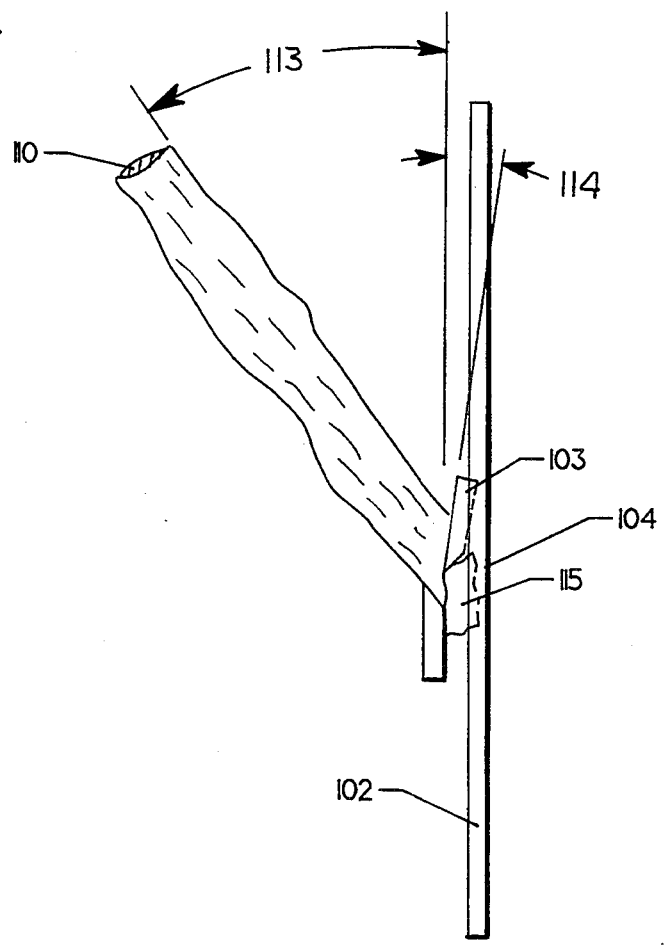
FIG. 5 is a schematic cross section view of FIG. 4 taken generally adjacent to the twig showing the chipping action of the disc of FIG. 4.

Turning now to FIGS. 4 and 5 and a special feature of this invention, a disc 100 is shown, which disc is similar to the disc 42 and is driven for rotation in the direction of arrow 102. A chipper blade 103 is fastened on one side of the disc substantially coextensive with the slot 104 formed in the disc and anvil 106 is shown schematically much as is provided in the apparatus of FIGS. 1 and 2. Twig 110 is shown in an angular position relative to disc 102, that angular position being limited in magnitude by the angle that exists between a suitable chipper inlet 18, (such as inlet 18 and particularly the floor 19 of the inlet 18). Angle A is defined as a clip angle which is the angle between the stationary anvil surface 106 and the rotating knife 103. The angle designated 112 is an angle between the hypothetical center line of the branch 110 and a tangent line drawn to the disc. The angle of that limb relative to the plane of the disc is shown at 113 and, where appropriate, the rotating knife is mounted at a slight angle relative to the plane of the disc which angle is designated by the numeral 114 and a rake angle, FIG. 5 showing the blade 103 removing a chip 115. Because of the angular relationship that exists between the anvil (which is effectively fixed in position along a line generally coextensive with the radius of the disc) and the chipper blade which is positioned so that, rotation in the direction of the arrow 102 creates a clip angle which provides scissors action tending to force material towards the edge of the feed chute (anvil) all of the features above combine to make the apparatus self-feeding.

It will therefore be seen that the present invention provides a device performing the basic yard chores of trash, leaf and twig removal on a easily moved four-wheeled platform which, if desired, can be made self-propelled with a suitable power takeoff from the motor. The operator can select the type of nozzle necessary for the work to be performed and if a vacuuming action is to be conducted on a substantially flat surface like a lawn, the nozzle of FIG. 9 can be used and is adjustably positioned relative to the ground by slight rotation of the air passageway cover relative to the housing. In those circumstances where it may be desired to rake materials to the inlet opening, the attachment of FIG. 8 maybe most desirable and in those situations where it is desired to remove leaves and other debris from gardens, the hose attachment can be put in position.

It is important to note that there is only a single moving element and in the preferred embodiment that moving element is a disc which is direct-connected at a suitable coupling 117 (see FIGS. 3 and 4) to the drive shaft of the motor. However if desired, other connections can be used and a power takeoff can be provided if it is desired to convert the apparatus into a self-propelled unit.

Nonetheless, as the disc rotates, limbs and the like inserted into the chipper inlet are reduced to small chips which pass through he aperture in the disc into the other side of the disc where they are entrained in the air and thrust against the 360 degree screen. Similarly materials drawn through the inlet entrained in the air drawn in by the rotating fan are also taken into the inlet and thrust against the 360 degree screen such action serving to further reduce the size of the material thrust against the screen.

As best seen in FIG. 2, with the disc rotating in a counterclockwise direction, the housing generally forms a volute curve with all debris passing through the screen being entrained in air and exiting through a single outlet located at the top of the housing. Because it is desired to direct the material downwardly when a bag is in position, a deflector is provided which deflector is attached to the single outlet opening to direct material downwardly into the loosely woven bag.

By minimizing a number of the moving parts, a device having a rugged long duty cycle has been provided and the need for maintenance on the apparatus itself is greatly reduced. Moreover, costs are kept low thereby by bringing such a chipper/shredder vacuum cleaner apparatus within reach of many homeowners thereby materially assisting the control of the ever increasing quantity of debris that must be disposed of by towns and in dumps and landfills.

As will be apparent to persons skilled in the art, various modifications, adaptations and variations of the foregoing specific disclosure can be made without departing from the teachings of this invention.

We claim:

1. Apparatus for chipping, shredding and vacuuming lawn and garden debris comprising:

a housing including a frame and support wheels permitting movement of the apparatus over a support surface;

a motor mounted on said frame;

a flat disc substantially enclosed within said housing and supported for rotation about a horizontal axis generally perpendicular to a nominal direction of apparatus movement when said apparatus is moved on said support wheels;

said disc having a driving connection to said motor for disc rotation within said housing;

a chipper blade mounted on a side of said disc facing said motor, said disc having an aperture extending therethrough adjacent said blade;

a chipper inlet passageway forming a part of said housing in communication with said chipper blade at least once each disc revolution;

an anvil supported on said housing in a position adjacent to said blade for cooperation with said blade upon each revolution of the disc to effect chipping of materials entering through said chipper inlet passageway to exit through the disc aperture;

a plurality of generally radially extending blades mounted on and fixed relative to the other side of said disc opposite said side of said disc facing said motor for rotation with said disc within said housing to thereby cause air movement within said housing;

said housing having a central area on one side adjacent to said blades provided with an opening in a housing sidewall substantially coaxial with the disc rotational axis;

a generally cylindrical screen supported on said housing in the opening and in a position coaxial with said disc, the diameter of said cylindrical screen being greater than a diametrical distance between radially outer ends of said blades so as to overlie the ends of said generally radially extending blades, said screen being interposed between the ends of said generally radially extending blades in said housing and said housing, said screen being further comprised of a pair of generally circular rims joined by a plurality of spaced bar members, one of the rims having an enlarged lip which is engageable with said housing adjacent the central area opening on one side thereof;

a cover for said housing opening partially defining an air passageway having an upstream air entrance end, said cover being removably fastened to said housing and having an aperture in the cover connected to said air passageway, said air passageway extending from said cover to said entrance end in a direction generally parallel to a major plane of said housing and a plane containing said disc to permit air to be drawn through said air passageway into said housing;

said housing having a peripheral wall and a top rear outlet, said wall forming a generally volute curve cooperating with the ends of said generally radially extending blades to cause air from said entrance end of said air passageway to be propelled by said blades axially into said housing and through said top rear outlet of said housing.

2. The apparatus of claim 1 wherein said removable cover for the central area opening on one side overlies said enlarged lip of said screen, said screen and said cover overlying the central opening in one sidewall of said housing, said cover and said screen being provided with spaced mating apertures through which fasteners simultaneously fasten said cover and said screen to said housing.

3. The apparatus of claim 1 wherein said removable cover for the central opening in one side is provided with slots through which fasteners attach said cover to said housing thereby to permit limited rotational adjustment of the angular position of said cover and to vary the position of said entrance end of said air passageway relative to said support surface.

* * * * *